(12) United States Patent
Willems

(10) Patent No.: US 12,517,759 B2
(45) Date of Patent: Jan. 6, 2026

(54) DISABLING OF MEMORY ALLOCATORS

(71) Applicant: SAP SE, Walldorf (DE)

(72) Inventor: Paul Willems, Heidelberg (DE)

(73) Assignee: SAP SE, Walldorf (DE)

( * ) Notice: Subject to any disclaimer, the term of this patent is extended or adjusted under 35 U.S.C. 154(b) by 828 days.

(21) Appl. No.: 17/736,721

(22) Filed: May 4, 2022

(65) Prior Publication Data

US 2023/0359494 A1 Nov. 9, 2023

(51) Int. Cl.
*G06F 9/50* (2006.01)
*G06F 9/445* (2018.01)

(52) U.S. Cl.
CPC ........ *G06F 9/5016* (2013.01); *G06F 9/44505* (2013.01)

(58) Field of Classification Search
CPC .. G06F 9/5016; G06F 9/44505; G06F 16/252; G06F 12/08; G06F 2212/1016; G06F 2212/163; G06F 2212/465; G06F 12/023
See application file for complete search history.

(56) References Cited

U.S. PATENT DOCUMENTS

| | | | | |
|---|---|---|---|---|
| 2010/0095280 A1* | 4/2010 | Schmelter | ........... | G06F 11/3466 718/1 |
| 2013/0117522 A1* | 5/2013 | Schreter | ................ | G06F 12/084 711/170 |
| 2014/0181024 A1* | 6/2014 | Becker | .................... | G06F 16/27 707/634 |
| 2014/0351656 A1* | 11/2014 | Moser | .................. | G06F 11/366 714/45 |
| 2015/0378799 A1* | 12/2015 | Liu | ........................ | G06F 11/073 717/127 |
| 2016/0335021 A1* | 11/2016 | Plonka | ................ | G06F 11/3037 |
| 2017/0068465 A1* | 3/2017 | Schreter | ................ | G06F 12/023 |
| 2018/0150392 A1* | 5/2018 | Booss | .................. | G06F 12/023 |
| 2018/0246676 A1* | 8/2018 | Schreter | ................ | G06F 3/0647 |
| 2018/0246807 A1* | 8/2018 | Andrei | ..................... | G06F 3/061 |
| 2018/0246911 A1* | 8/2018 | Lee | ......................... | G06F 16/21 |
| 2018/0349424 A1* | 12/2018 | Gurajada | ............... | G06F 3/0604 |
| 2019/0042124 A1* | 2/2019 | Doshi | .................... | G06F 3/0653 |
| 2019/0347208 A1* | 11/2019 | Thiel | ................... | G06F 12/0223 |
| 2019/0354407 A1* | 11/2019 | Booss | .................. | G06F 16/256 |
| 2019/0354620 A1* | 11/2019 | Eluri | .................... | G06F 16/2322 |
| 2021/0365370 A1* | 11/2021 | Scott-Jones | ......... | G06F 12/0292 |
| 2022/0291962 A1* | 9/2022 | Cherches | ............ | G06F 12/0246 |

* cited by examiner

*Primary Examiner* — Kenneth Tang
(74) *Attorney, Agent, or Firm* — Mintz Levin Cohn Ferris Glovsky and Popeo, P.C.

(57) ABSTRACT

A method, a system, and a computer program product for executing memory allocations. One or more memory allocations for execution of one or more portions of a software application are generated. One or more configuration settings of the generated one or more memory allocations are determined. Based on the determined configuration settings, at least one memory allocation in one or more memory allocations is deactivated. One or more portions of the software application are executed based on the deactivating.

8 Claims, 5 Drawing Sheets

DISABLING OF MEMORY ALLOCATORS

TECHNICAL FIELD

This disclosure relates generally to data processing and, in particular, to deactivating and/or disabling of memory allocators (such as, for example, for debugging).

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

In some implementations, the current subject matter relates to a computer implemented method for executing memory allocations. The method may include generating one or more memory allocations for execution of one or more portions of a software application, determining one or more configuration settings of the generated one or more memory allocations, deactivating, based on the determined one or more configuration settings, at least one memory allocation in the one or more memory allocations, and executing, based on the deactivating, the one or more portions of the software application.

In some implementations, the current subject matter may include one or more of the following optional features. One or more memory allocations may include at least one of the following: one or more temporary memory allocations for one or more portions of the software application, a parent memory allocation for execution of the software application, and any combination thereof.

In some implementations, the deactivating may include deactivating, based on the determined one or more configuration settings, at least one temporary memory allocation. The executing may include executing the software application using the parent memory allocation. The executing may also include executing the software application using the parent memory allocation with the deactivated temporary memory allocation.

In some implementations, the determining may include detecting in one or more generated memory allocations a presence of at least one temporary memory allocation in one or more generated memory allocations. The generated memory allocations may include at least one of the following: an allocation of memory and deallocation of memory.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
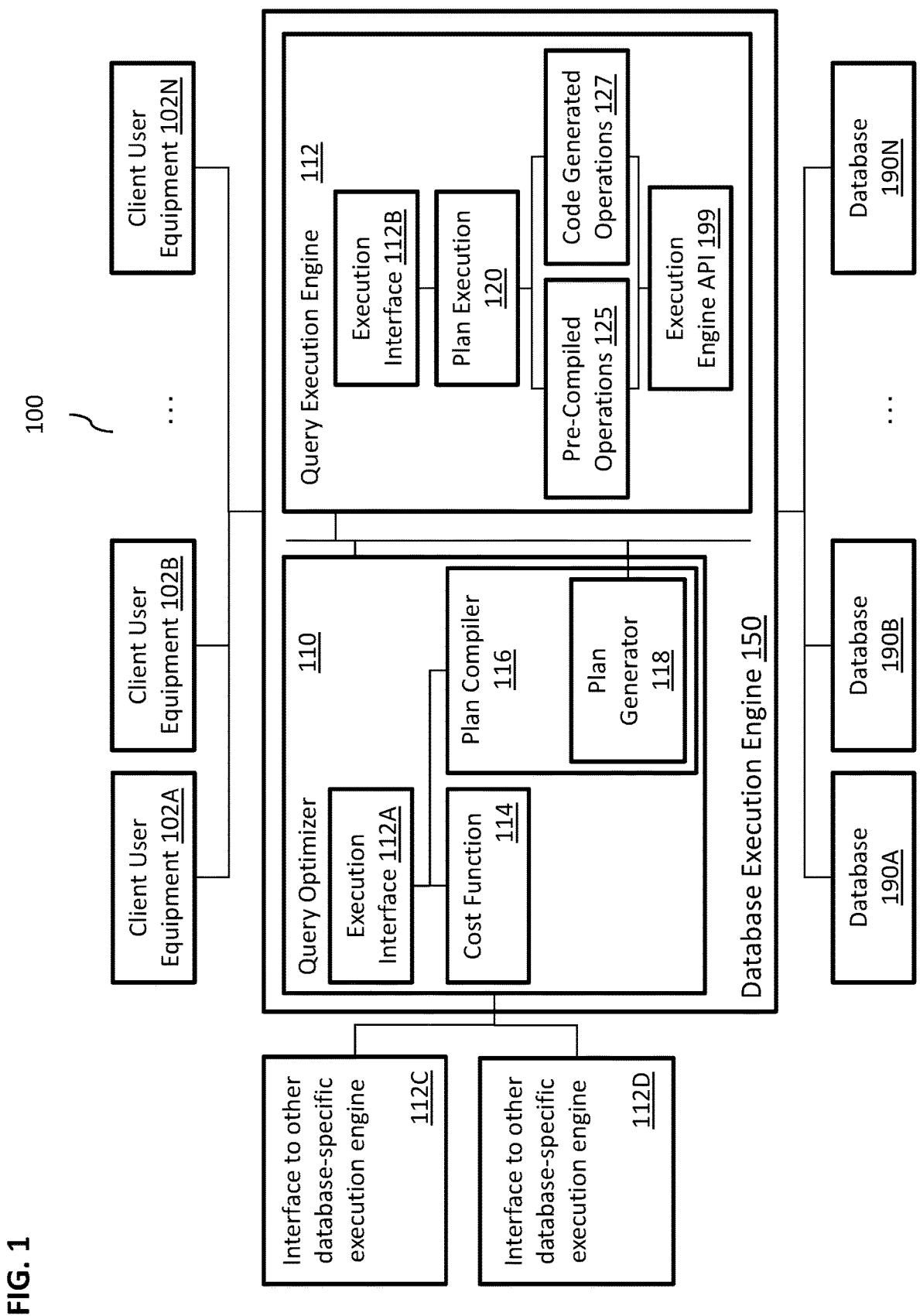
FIG. 1 illustrates an exemplary system, according to some implementations of the current subject matter.

To address these and potentially other deficiencies of currently available solutions, one or more implementations of the current subject matter relate to methods, systems, articles of manufacture, and the like that can, among other possible advantages, provide deactivating and/or disabling memory allocators (e.g., for debugging).

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

In some example implementations, there may be provided an execution engine that may decouple the higher-level, application layer from the database layer (e.g., the persistence or storage layer where data including database tables may be stored and/or queried using instructions, such as commands and/or the like). The execution engine may be implemented separately from the database layer and/or the application layer. Further, the execution engine may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Further, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform query execution for a variety of database types and send queries to the different types of database layers (and/or their storage/persistence layer) and handle the corresponding responses.

FIG. 1 illustrates an exemplary system 100, according to some implementations of the current subject matter. The system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 1, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

In some example implementations, the query execution engine 150 may run, as noted above, just-in-time code 127 generated for some query operations, while pre-compiled code 125 may be run for other operations. Moreover, the query execution engine 150 may combine the generated code 127 with pre-compiled code 125 to further optimize execution of query related operations. In addition, the query execution engine 150 may provide for a plan execution framework that is able to handle data chunk(s), pipelining, and state management during query execution.

In database processing, an "allocator" may refer to a computing sub-component that may be configured to manage memory associated with execution of a computing program. In particular, an allocator may handle all requests for allocation and/or deallocation of memory for a particular data structure or container. By way of a non-limiting example, an allocator may be a computing component and/or software code, e.g., a default C/C++ malloc functionality. In some cases, one or more specialized allocators may be used to provide, for example, for one or more extended features for memory resource management (e.g., statistics, booking, statement memory limits, etc.) and/or supportability (e.g., capturing stack traces of allocations and/or deallocations, memory fencing, etc.). Some reasons for using specialized allocators may also include improving performance of allocations by using memory pools, and/or encapsulating access to different types of memory, such as, shared memory and/or garbage-collected memory. In particular, programs with many frequent allocations of small amounts of memory may benefit greatly from specialized allocators, in terms of running time and/or memory footprint.

In addition to its various basic and/or advanced features, all general-purpose allocators may be configured to provide thread-safety, i.e., to be callable in parallel from multiple processing threads. In that regard, a single memory deallocation and/or allocation may be expensive, and hence, when a software code is being optimized, it may be desirable to avoid memory allocations and/or deallocations.

One approach to amortize memory de/allocation costs may include use of special-purpose memory allocators. Such allocators may be configured to allocate a larger memory page once, and then use this memory page for subsequent smaller allocations by iterating over the page using an increasing offset (e.g., new location within that memory page). Any allocation beyond the single page may be transmitted to an underlying parent allocator. However, this approach might not offer process thread-safety, nor the ability to free memory early. Such a scheme may work well, for instance, inside a function where allocations may be within on-thread and that many smaller allocations may be required for "workspace" memory, which is only used inside the function and not for any part of the result, and thus may be released en-bloc at the end of the function.

A temporary or a "temp" allocator may be a special-purpose allocator. Some special-purpose allocators may improve performance and/or memory usage of a particular program. However, such allocators may encounter issues when memory corruptions and/or leaks occur. This is because temp allocators do not typically implement extended features of full memory allocators, such as, allocation/deallocation stack traces, memory fencing, etc. which are more often than not important to analysis of memory corruptions and/or other problems.

In some implementations, to resolve the issues with temporary and/or other special-purpose allocators, the current subject matter may be configured to implement a configuration switch to deactivate and/or disable use of temporary/special-purpose allocators. The configuration switch may be checked at the time a memory allocator instance is generated. The checking may be performed by detecting presence of such configuration switch (and/or any parameters, indicators, etc. associated with the configuration switch). This may avoid any overhead of checking this configuration switch too often, and may further avoid changing existing application program's code related to memory allocations.

The configuration setting associated with memory allocation may be checked only once when the temporary allocator instance is generated. Additionally, any internal settings associated with memory allocations may be customized for each kind of temporary allocator to ensure that each incoming memory allocation is automatically forwarded to the underlying (full) parent allocator (e.g., an allocation of memory for execution of the entire software application). This may ensure that there is no extra processing and/or memory overhead as long as the configuration is not activated. For example, for a single-page backed temporary memory allocator, an internal page size may be set to 0.

Figure 2:
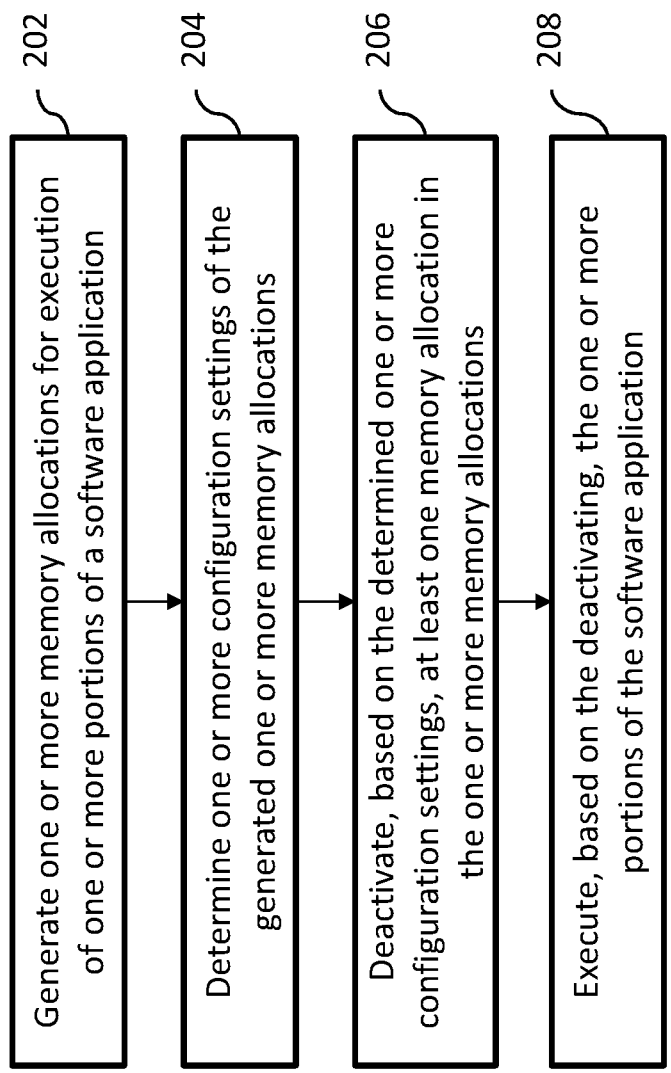
FIG. 2 illustrates an exemplary process for executing memory allocation, according to some implementations of the current subject matter.

FIG. 2 illustrates an exemplary process 200 for executing memory allocation, according to some implementations of the current subject matter. The process 200 may be executed using one or more components of the system 100 shown in FIG. 1. At 202, one or more memory allocation may be generated for the purposes of execution of one or more portions of a software application. A memory allocation may include a parent allocator (e.g., an allocation of memory for execution of the entire application) and/or a temporary allocator (e.g., a special purpose allocator).

At 204, one or more configuration settings associated with the generated one or more memory allocations may be determined. This procedure may be performed once to determine whether any of the temporary memory allocators are present. Checking this configuration once may ensure that any memory overhead is reduced.

At 206, the current subject matter may be configured to deactivate (and/or disable) at least one memory allocation in the generated memory allocations based on the determined configuration settings associated with a particular allocator. For example, the deactivated memory allocations may include temporary memory allocations.

At 208, the software application and/or any of its portions for which memory allocations have been generated may be executed. As stated above, the generated memory allocations may include at least one of the following: one or more temporary memory allocations for one or more portions of the software application, a parent memory allocation for execution of the software application, and any combination thereof. The parent memory allocation may correspond to an entire memory allocation for execution of the software application.

In some implementations, as stated above, the current subject matter may be configured to deactivate (and/or disable) at least one temporary memory allocation. Because of the "expense" associated with the temporary memory allocations, checking such configuration once and deactivating it, may allow use of the parent memory allocation for the purposes of execution of the software application. Thus, the software application may be executed using the parent memory allocation with the deactivated temporary memory allocation.

In some implementations, to determine whether temporary memory allocations are present, the current subject matter may be configured to detect in the generated memory allocations a presence of at least one temporary memory allocation and/or special-purpose memory allocation in the generated memory allocations. Further, the generated memory allocations may include at least one of the following: an allocation of memory and deallocation of memory.

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 3:
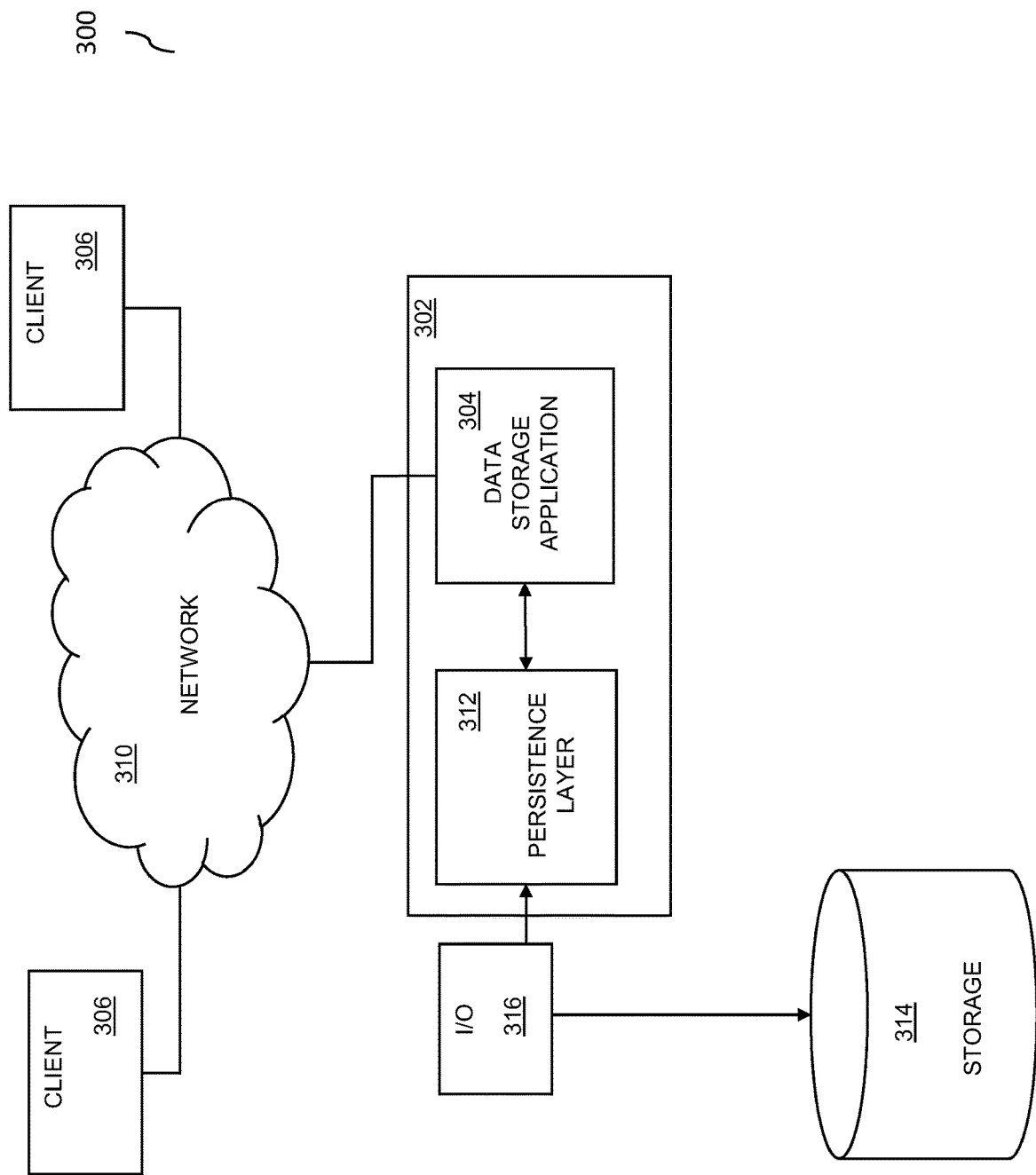
FIG. 3 is a diagram illustrating an exemplary system including a data storage application, according to some implementations of the current subject matter.

FIG. 3 illustrates an exemplary system 300 in which a computing system 302, which may include one or more programmable processors that may be collocated, linked over one or more networks, etc., executes one or more modules, software components, or the like of a data storage application 304, according to some implementations of the current subject matter. The data storage application 304 may include one or more of a database, an enterprise resource program, a distributed storage system (e.g. NetApp Filer available from NetApp of Sunnyvale, CA), or the like.

The one or more modules, software components, or the like may be accessible to local users of the computing system 302 as well as to remote users accessing the computing system 302 from one or more client machines 306 over a network connection 310. One or more user interface screens produced by the one or more first modules may be displayed to a user, either via a local display or via a display associated with one of the client machines 306. Data units of the data storage application 304 may be transiently stored in a persistence layer 312 (e.g., a page buffer or other type of temporary persistency layer), which may write the data, in the form of storage pages, to one or more storages 314, for example via an input/output component 316. The one or more storages 314 may include one or more physical storage media or devices (e.g. hard disk drives, persistent flash memory, random access memory, optical media, magnetic media, and the like) configured for writing data for longer term storage. It should be noted that the storage 314 and the input/output component 316 may be included in the computing system 302 despite their being shown as external to the computing system 302 in FIG. 3.

Data retained at the longer term storage 314 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 4:
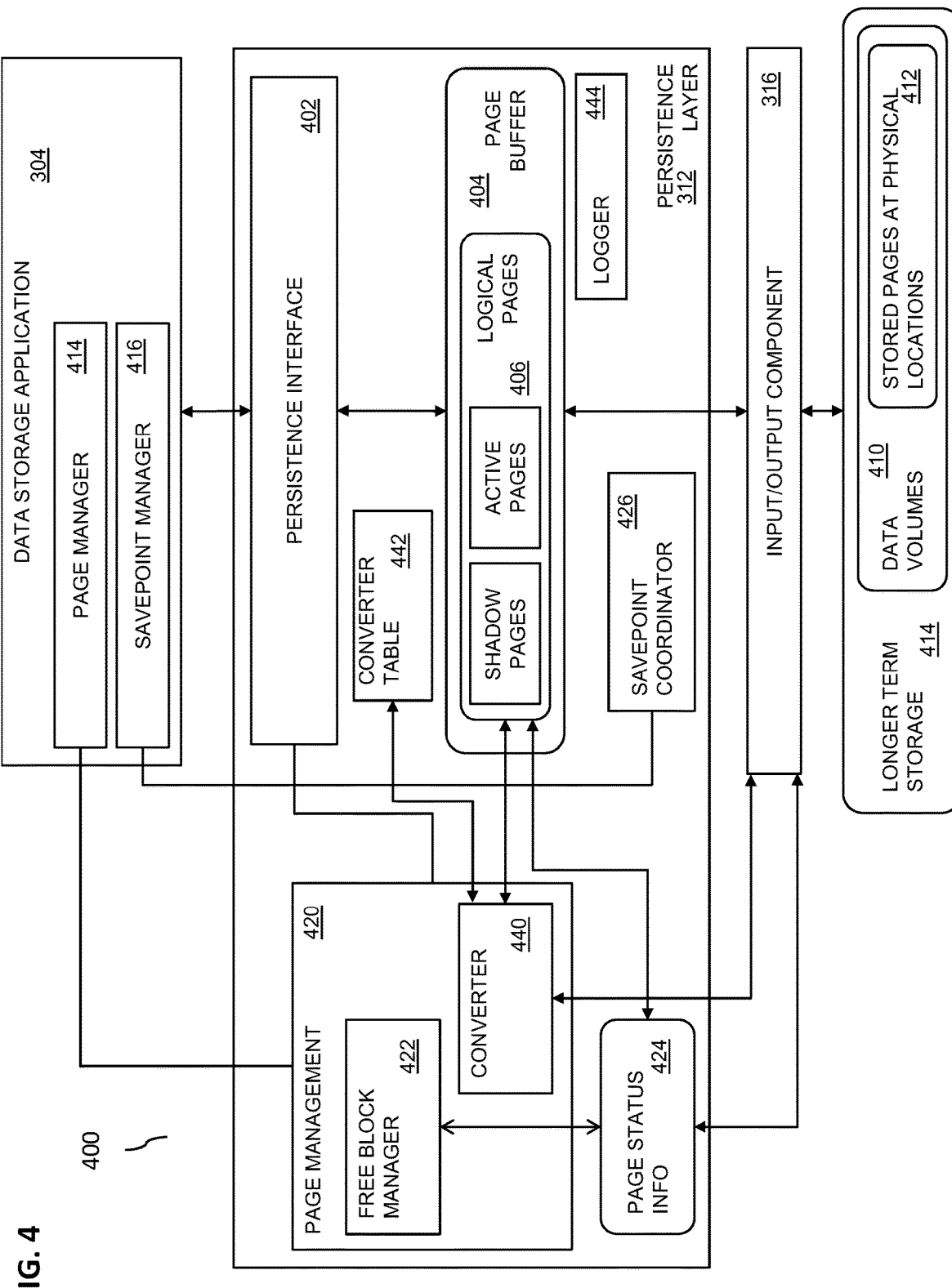
FIG. 4 is a diagram illustrating details of the system of FIG. 3.

FIG. 4 illustrates exemplary software architecture 400, according to some implementations of the current subject matter. A data storage application 304, which may be implemented in one or more of hardware and software, may include one or more of a database application, a network-attached storage system, or the like. According to at least some implementations of the current subject matter, such a data storage application 304 may include or otherwise interface with a persistence layer 312 or other type of memory buffer, for example via a persistence interface 402. A page buffer 404 within the persistence layer 312 may store one or more logical pages 406, and optionally may include shadow pages, active pages, and the like. The logical pages 406 retained in the persistence layer 312 may be written to a storage (e.g. a longer term storage, etc.) 314 via an input/output component 316, which may be a software module, a sub-system implemented in one or more of software and hardware, or the like. The storage 314 may include one or more data volumes 410 where stored pages 412 are allocated at physical memory blocks.

In some implementations, the data storage application 304 may include or be otherwise in communication with a page manager 414 and/or a savepoint manager 416. The page manager 414 may communicate with a page management module 420 at the persistence layer 312 that may include a free block manager 422 that monitors page status information 424, for example the status of physical pages within the storage 314 and logical pages in the persistence layer 312

(and optionally in the page buffer 404). The savepoint manager 416 may communicate with a savepoint coordinator 426 at the persistence layer 312 to handle savepoints, which are used to create a consistent persistent state of the database for restart after a possible crash.

In some implementations of a data storage application 304, the page management module of the persistence layer 312 may implement a shadow paging. The free block manager 422 within the page management module 420 may maintain the status of physical pages. The page buffer 404 may include a fixed page status buffer that operates as discussed herein. A converter component 440, which may be part of or in communication with the page management module 420, may be responsible for mapping between logical and physical pages written to the storage 314. The converter 440 may maintain the current mapping of logical pages to the corresponding physical pages in a converter table 442. The converter 440 may maintain a current mapping of logical pages 406 to the corresponding physical pages in one or more converter tables 442. When a logical page 406 is read from storage 314, the storage page to be loaded may be looked up from the one or more converter tables 442 using the converter 440. When a logical page is written to storage 314 the first time after a savepoint, a new free physical page is assigned to the logical page. The free block manager 422 marks the new physical page as "used" and the new mapping is stored in the one or more converter tables 442.

The persistence layer 312 may ensure that changes made in the data storage application 304 are durable and that the data storage application 304 may be restored to a most recent committed state after a restart. Writing data to the storage 314 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 444 may also be included to store the changes made to the data of the data storage application in a linear log. The logger component 444 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 444 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 312 may use a combination of undo log entries (from one or more logs) and shadow paging.

The persistence interface 402 may handle read and write requests of stores (e.g., in-memory stores, etc.). The persistence interface 402 may also provide write methods for writing data both with logging and without logging. If the logged write operations are used, the persistence interface 402 invokes the logger 444. In addition, the logger 444 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 444. For an entry of type "update", for example, this would be the identification of the affected record and the after image of the modified data.

When the data application 304 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 444 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 444 may write a database log (or simply referred to herein as a "log") sequentially into a memory buffer in natural order (e.g., sequential order, etc.). If several physical hard disks/storage devices are used to store log data, several log partitions may be defined. Thereafter, the logger 444 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 304 may use shadow paging so that the savepoint manager 416 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 5:
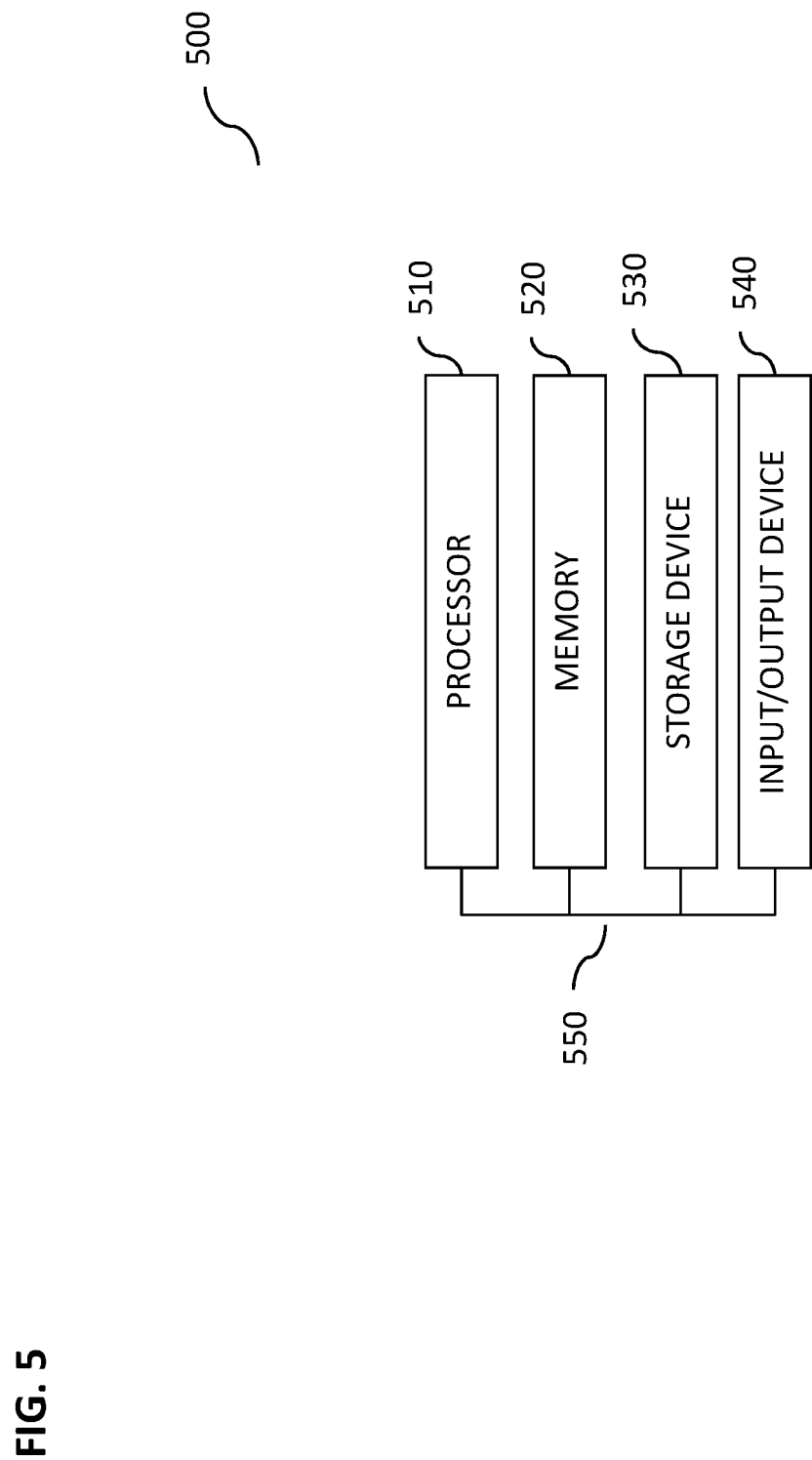
FIG. 5 is an exemplary system, according to some implementations of the current subject matter.

In some implementations, the current subject matter may be configured to be implemented in a system 500, as shown in FIG. 5. The system 500 may include a processor 510, a memory 520, a storage device 530, and an input/output device 540. Each of the components 510, 520, 530 and 540 may be interconnected using a system bus 550. The processor 510 may be configured to process instructions for execution within the system 500. In some implementations, the processor 510 may be a single-threaded processor. In alternate implementations, the processor 510 may be a multi-threaded processor. The processor 510 may be further configured to process instructions stored in the memory 520 or on the storage device 530, including receiving or sending information through the input/output device 540. The memory 520 may store information within the system 500. In some implementations, the memory 520 may be a computer-readable medium. In alternate implementations, the memory 520 may be a volatile memory unit. In yet some implementations, the memory 520 may be a non-volatile memory unit. The storage device 530 may be capable of providing mass storage for the system 500. In some implementations, the storage device 530 may be a computer-readable medium. In alternate implementations, the storage device 530 may be a floppy disk device, a hard disk device, an optical disk device, a tape device, non-volatile solid state memory, or any other type of storage device. The input/output device 540 may be configured to provide input/output operations for the system 500. In some implementations, the input/output device 540 may include a keyboard and/or pointing device. In alternate implementations, the input/output device 540 may include a display unit for displaying graphical user interfaces.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
generating one or more memory allocations for execution of one or more portions of a software application, the one or more memory allocations comprising a temporary memory allocation and a parent memory allocation;
generating a temporary allocator instance for managing the temporary memory allocation;
checking, only once when the temporary allocator instance is generated, a configuration setting associated with the temporary memory allocation;
determining a memory corruption status associated with the one or more portions of the software application;
deactivating, based on the configuration setting and the memory corruption status, the temporary memory allocation by setting an internal page size associated with the temporary memory allocation to zero; and
executing, based on the deactivating, the one or more portions of the software application using the parent memory allocation.

2. The method according to claim 1, further comprising detecting in the one or more memory allocations a presence the temporary memory allocation in the one or more memory allocations.

3. The method according to claim 2, wherein the one or more memory allocations include at least one of the following: an allocation of memory and a deallocation of memory.

4. A system comprising:
at least one programmable processor; and
a non-transitory machine-readable medium storing instructions that, when executed by the at least one programmable processor, cause the at least one programmable processor to perform operations comprising:
generating one or more memory allocations for execution of one or more portions of a software application, the one or more memory allocations comprising a temporary memory allocation and a parent memory allocation;
generating a temporary allocator instance for managing the temporary memory allocation;
checking, only once when the temporary allocator instance is generated, a configuration setting associated with the temporary memory allocation;
determining a memory corruption status associated with the one or more portions of the software application;
deactivating, based on the configuration setting and the memory corruption status, the temporary memory allocation by setting an internal page size associated with the temporary memory allocation to zero; and
executing, based on the deactivating, the one or more portions of the software application using the parent memory allocation.

5. The system according to claim 4, further comprising detecting in the one or more memory allocations a presence of the temporary memory allocation in the one or more memory allocations.

6. The system according to claim 5, wherein the one or more memory allocations include at least one of the following: an allocation of memory and a deallocation of memory.

7. A computer program product comprising a non-transitory machine-readable medium storing instructions that, when executed by at least one programmable processor, cause the at least one programmable processor to perform operations comprising:
generating one or more memory allocations for execution of one or more portions of a software application, the one or more memory allocations comprising a temporary memory allocation and a parent memory allocation;
generating a temporary allocator instance for managing the temporary memory allocation;
checking, only once when the temporary allocator instance is generated, a configuration setting associated with the temporary memory allocation;
determining a memory corruption status associated with the one or more portions of the software application;
deactivating, based on the configuration setting and the memory corruption status, the temporary memory allocation by setting an internal page size associated with the temporary memory allocation to zero; and
executing, based on the deactivating, the one or more portions of the software application using the parent memory allocation.

8. The computer program product according to claim 7, further comprising detecting in the one or more memory allocations a presence of the temporary memory allocation in the one or more memory allocations;
wherein the one or more memory allocations include at least one of the following: an allocation of memory and a deallocation of memory.

* * * * *